(12) United States Patent
Ri et al.

(10) Patent No.: US 8,066,234 B2
(45) Date of Patent: Nov. 29, 2011

(54) IMAGE DISPLAY APPARATUS

(75) Inventors: Mika Ri, Yokohama (JP); Masahiro Yamamoto, Fujisawa (JP); Yutaka Yamada, Yokohama (JP); Kohei Miyoshi, Fujisawa (JP); Teppei Tanaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 308 days.

(21) Appl. No.: 12/258,132

(22) Filed: Oct. 24, 2008

(65) Prior Publication Data

US 2009/0114792 A1 May 7, 2009

(30) Foreign Application Priority Data

Nov. 6, 2007 (JP) ................................. 2007-288767

(51) Int. Cl.
*F16M 11/00* (2006.01)

(52) U.S. Cl. ............. 248/125.8; 248/125.1; 248/295.11; 248/188.4; 248/919

(58) Field of Classification Search ............... 248/124.1, 248/125.3, 125.7, 125.8, 295.11, 287.1, 354.3–354.5, 248/457, 17, 917–991, 188.4, 188.5, 188.8, 248/440.1; 361/679.01, 679.05, 681, 683
See application file for complete search history.

(56) References Cited

U.S. PATENT DOCUMENTS

| | | | |
|---|---|---|---|
| 5,701,695 A * | 12/1997 | Current | 40/606.14 |
| 5,751,548 A * | 5/1998 | Hall et al. | 361/679.41 |
| 5,797,568 A * | 8/1998 | Gongora et al. | 248/122.1 |
| 5,904,328 A * | 5/1999 | Leveridge et al. | 248/124.1 |
| 6,381,125 B1 * | 4/2002 | Mizoguchi et al. | 361/679.08 |
| 6,581,887 B2 * | 6/2003 | Lapidez | 248/122.1 |
| 6,918,564 B2 * | 7/2005 | Yen et al. | 248/404 |
| 6,977,627 B1 * | 12/2005 | Dalton | 345/1.1 |
| 7,118,080 B2 * | 10/2006 | Chan et al. | 248/129 |
| 7,287,729 B2 * | 10/2007 | Jung et al. | 248/122.1 |
| 7,369,401 B1 * | 5/2008 | Floersch et al. | 361/679.27 |
| 7,762,515 B2 * | 7/2010 | Lin | 248/447 |

FOREIGN PATENT DOCUMENTS

JP 2007-134825 * 5/2007

* cited by examiner

*Primary Examiner* — Tan Le
(74) *Attorney, Agent, or Firm* — Kilpatrick Townsend & Stockton LLP

(57) ABSTRACT

A large-screen image display apparatus includes a stand for supporting the display module, which has a leg portion. The leg portion of the stand is inserted into the main frame. The leg portion and the main frame are fastened together at a first screw hole formed through the leg portion. In addition, the leg portion and a fixing part of the outer frame are fastened together at a second screw hole formed through the leg portion. The first screw hole and the second screw hole are formed on different faces of the leg portion and at different heights. This can provide a large-screen image display apparatus with a less-wobble, high-safety, high-reliability, and low-cost stand-attaching structure.

1 Claim, 6 Drawing Sheets

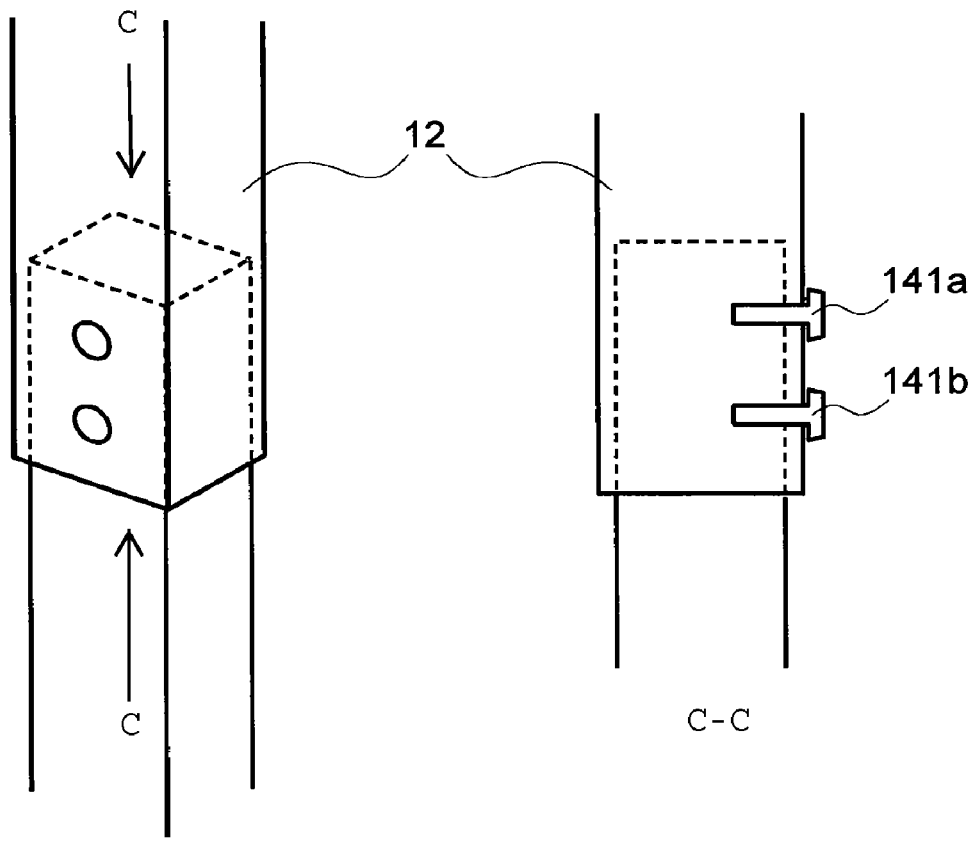

IMAGE DISPLAY APPARATUS

CLAIMS OF PRIORITY

The present application claims priority from Japanese patent application serial no. JP2007-288767, filed on Nov. 6, 2007, the content of which is hereby incorporated by reference into this application.

BACKGROUND OF THE INVENTION

The present invention relates to image display apparatus and particularly to the stand-attaching structure of a large-screen plasma display apparatus for stably setting up the same.

In recent years, as a result of components made less expensive, manufacture technologies improved, and the pursuit of visual comfort of users and appeal for them, the screen sizes of liquid crystal display (LCD) apparatus and plasma display panel (PDP) apparatus have been increasing.

Particularly in the case of the PDP apparatus, which can often be increased easily in its screen size, models with 40-inch screens or larger are becoming common even for home use. However, the PDP apparatus weighs more for structural reasons. A PDP apparatus of the 40-inch type weighs about 30 Kg, and the weight of a 50-inch one reaches 40 Kg.

Therefore, a large-screen PDP apparatus is required to have a stand-attaching structure capable of securing the apparatus to a stand. For example, FIG. 3 and FIG. 4 in JP-A-2007-134825 disclose examples of fixing a PDP apparatus to a stand.

With FIG. 5 and FIG. 6, the following describes a stand-attaching structure employed in prior art PDP apparatus and its drawbacks.

FIG. 5 is a perspective rear view of a PDP apparatus where a prior art stand-attaching structure is employed.

FIG. 6 depicts a leg portion of the prior art stand to which a main frame is fixed.

In FIG. 6A, the leg portion of the stand to which the main frame is fixed is depicted perspectively. FIG. 6B is a sectional view of the leg portion to which the main frame is fixed.

The PDP module 1 of the PDP apparatus has an outer frame 3 attached around the periphery thereof. To support the PDP module 1, two vertical main frames 12 are fixed to the outer frame 3 and back side of the PDP module 1 with screws. One face of each main frame 12, provided with two screw holes formed therethrough, is fastened to a leg portion 140 of a stand 12 with screws 141a and 141b as shown in FIG. 6A and FIG. 6B. The securing of the PDP apparatus to the stand shown in FIG. 3 and FIG. 4 of Japanese Patent Laid Open No. 2007-134825 cited above is similar to the above manner.

However, this attaching structure poses the problem that the apparatus may wobble greatly if the weight of the PDP module is large since only a single face of each main frame 12 is fastened to one of the leg portions 140 of the stand 14 with screws. Especially, in the case of an apparatus for home use, it is necessary to secure the safety and reliability of the apparatus by enhancing its quake resistance. However, adding reinforcing members for this purpose causes the drawback of raising the manufacture costs.

The present invention was made to solve the above-mentioned problem. Its object is to provide a less-wobble, high-safety, high-reliability, and low-cost stand-attaching structure for a large-screen image display apparatus.

SUMMARY OF THE INVENTION

The image display apparatus of the present invention comprises: a display module; an outer frame shaped so as to fit along the rim of the rear surface of the display module; a hollow, bar-shaped main frame for supporting the display module, which is arranged to extend vertically and fixed to the upper and lower portions of the outer frame and to the rear surface of the display module by a fixing part; and a stand for supporting the display module, which has a leg portion.

The leg portion of the stand is inserted into the main frame. The leg portion and the main frame are fastened together by screwing a screw through a screw hole formed through the main frame and a first screw hole formed through the leg portion.

In addition, the leg portion and a fixing part of the outer frame are fastened together by screwing a screw through a second screw hole formed through the leg portion and a screw hole formed in the fixing part of the outer frame. The first screw hole and the second screw hole are formed on different faces of the leg portion and at different heights.

This can provide a large-screen image display apparatus with a less-wobble, high-safety, high-reliability, and low-cost stand-attaching structure.

BRIEF DESCRIPTION OF DRAWINGS

FIG. 6 (a perspective view and a sectional view) shows a leg portion of the prior art stand to which a main frame is fixed.

DESCRIPTION OF THE PREFERRED EMBODIMENTS

Embodiments of the present invention will be described below by using FIG. 1 through FIG. 4.

Figure 1A:
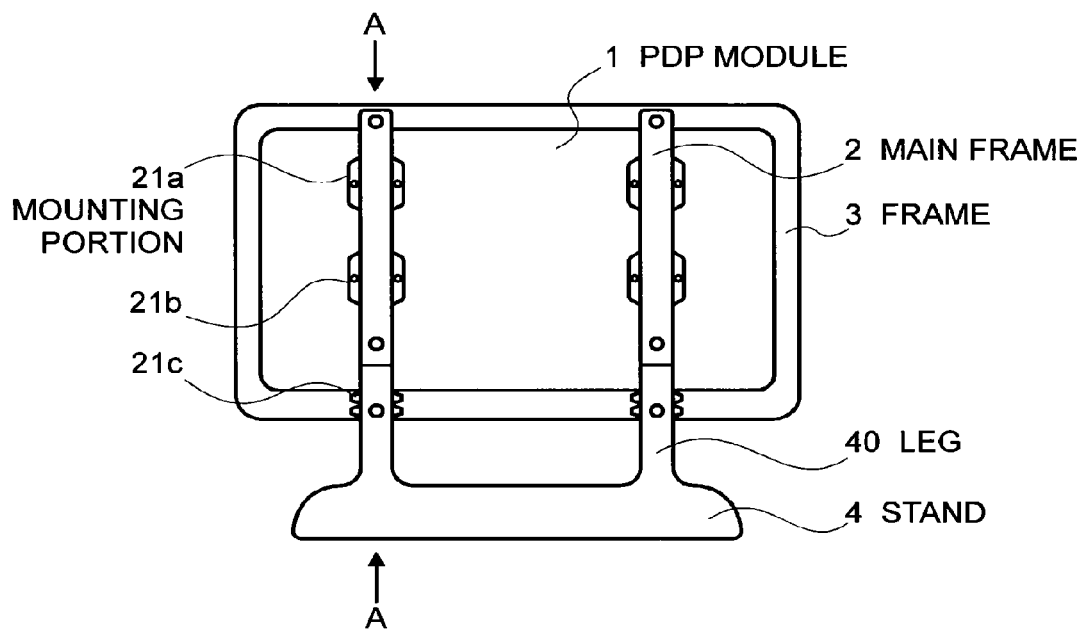
FIG. 1 (a rear view, a sectional view along A-A' line, and a front view) shows the construction of an image display apparatus in accordance with an embodiment of the present invention.
Figure 1B:
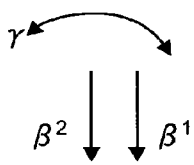
Figure 1C:
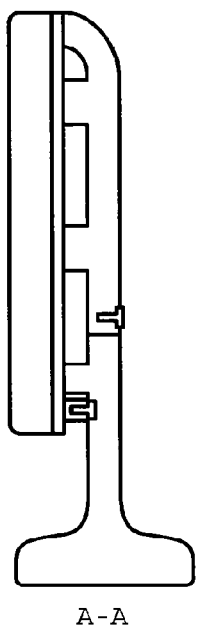
Figure 2:
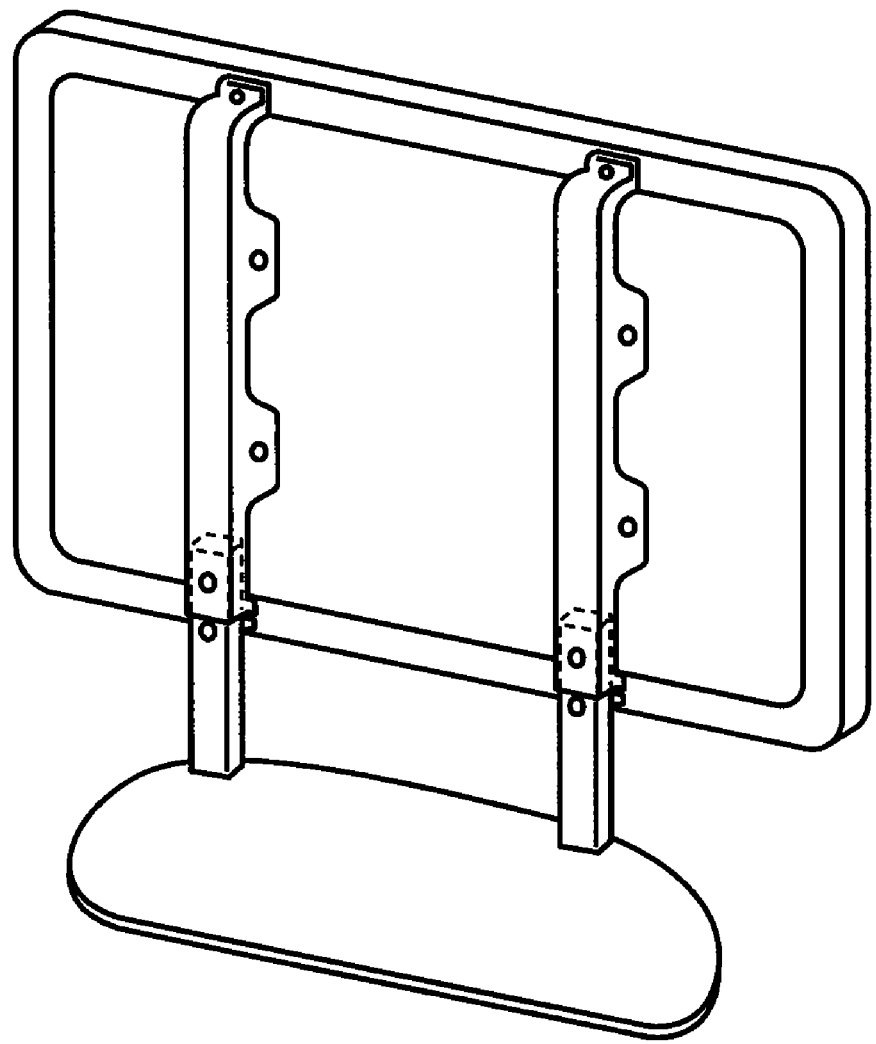
FIG. 2 (a perspective view) shows the construction of the image display apparatus in accordance with the embodiment of the present invention.

First, the following describes the construction of an image display apparatus in accordance with an embodiment of the present invention by using FIG. 1 and FIG. 2.

FIG. 1 and FIG. 2 illustrate the construction of the image display apparatus in accordance with the present embodiment of the present invention.

FIG. 1A is a rear view of the image display apparatus in accordance with the present embodiment of the invention. FIG. 1B is its sectional view taken along A-A' line of FIG. 1A. FIG. 1C is its front view.

FIG. 2 is a perspective rear view of the image display apparatus in accordance with the present embodiment of the invention.

As shown in FIG. 1A, the PDP apparatus of the present embodiment has an outer frame 3 attached around a PDP module 1 which displays images. In addition, bar-shaped main frames 2 are disposed vertically. Each of the main frames 2 is fixed to the upper portion of the outer frame 3 with a screw. It also has fixing parts 21a and 21b fixed to the back side of the PDP module 1 with screws and a fixing part 21c fixed to the lower portion of the outer frame 3. The PDP module 1 has a high pressure mixture of noble gases such as helium and neon held hermetically between two glass panels, which have electrodes formed on their inner surfaces. A metallic panel of iron or aluminum forms the rear surface. The peripheral panel 3 is fixed to the metallic panel with screws. In addition, a power supply board, a main board containing a tuner, decode block, and others, X-SUS and Y-SUS boards set to control the signals for driving the PDP screen, a hard disk drive to store picture recording data and programs, and others are installed in the PDP module 1 although they are not shown in FIG. 1.

The main frame 2 has a hollow rectangular pipe shape. A leg portion 40 of a stand 4 is inserted into the hollow and fixed to the main frame 2 with a screw. The leg portion 40 is screwed to a fixing part 31 attached to the outer frame 3.

FIG. 1B is a sectional view along A-A line of FIG. 1A. As shown in FIG. 1B, the leg portion 40 of the stand 4 and the main frame 2 are fastened together on a plane $\beta 1$ with a screw while the leg portion 40 of the stand 4 and the fixing part 31 provided on the outer frame 3 are also fastened together on a plane $\beta 2$ with a screw, wherein the planes $\beta 1$ and $\beta 2$ are two different planes both parallel to the surface of the PDP module 1.

By using FIG. 3, the relevant structure for attaching the PDP apparatus to the stand is described below in detail.

FIG. 3 illustrates the stand-attaching structure in accordance with the present embodiment of the present invention.

Figure 3A:
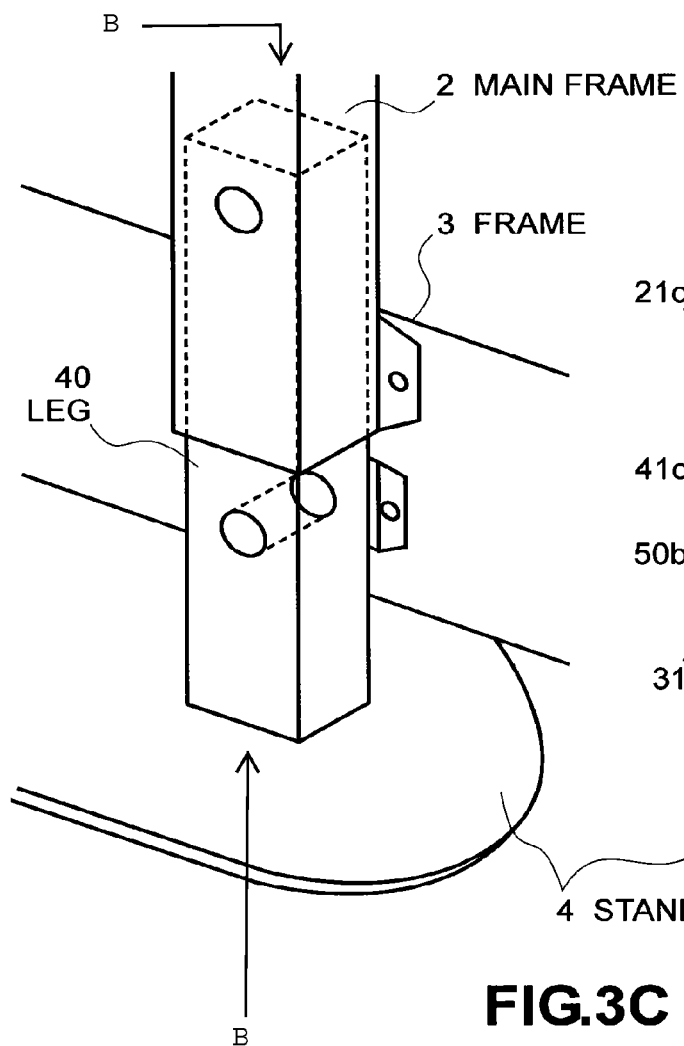
FIG. 3 (a perspective view, a sectional view, and a front view) shows a stand-attaching structure in accordance with the embodiment of the present invention.
Figure 3B:
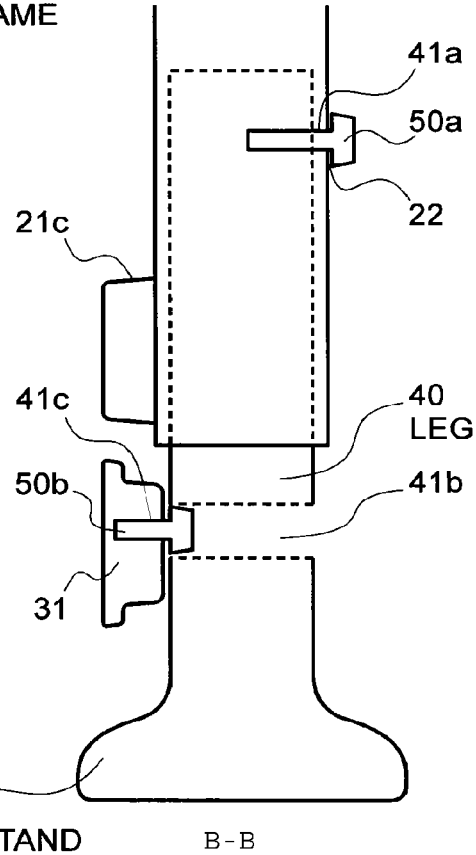
Figure 3C:
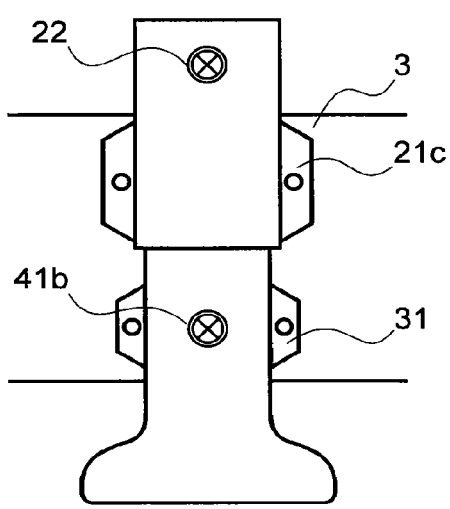

FIG. 3A is a perspective view. FIG. 3B is a sectional view illustrating the structure for fixing the stand's leg portion 40 to the main frame 2. FIG. 3C is a front view of the structure for fixing the stand's leg portion 40 to the main frame 2.

The main frame 2 has a hollow rectangular pipe shape. The leg portion 40 is also a hollow rectangular pipe and can be inserted into the hollow of the main frame 2 because of its size smaller than the main frame 2.

The main frame 2 and the leg portion 40 respectively have screw holes 22 and 41a formed therethrough, and they are screwed together by inserting a screw 50a into the screw holes 22 and 41a.

In addition, the front wall of the leg portion 40 has a through hole 41b formed therethrough while the fixing part 31 disposed across the through hole 41b (disposed at the back of the leg portion 40) has a screw hole 41c formed therein. With a screw 50b screwed into the screw hole 41c, the fixing part 31 provided on the outer frame 3 and the rear wall of the leg portion 40 are fixed together.

Thus, as shown in FIG. 1B, the leg portion 40 of the stand 4 and the main frame 2 are screwed together on the plane $\beta 1$ parallel to the PDP module 1 while the leg portion 40 of the stand 4 and the fixing part 31 provided on the outer frame 3 are screwed together on the other plane $\beta 2$ parallel to the PDP module 1 with the screws located at different heights.

This way of fixing the leg portion 40 of the stand 4 disperses the load and results in a physically stable structure since the leg portion 40 is clamped to the different planes $\beta 1$ and $\beta 2$ at different heights. It is therefore possible to realize a quake-resistant, highly stiff attaching structure. In addition, even if the PDP module 1 is rocked back and forth as indicated by $\gamma$ in FIG. 1B, the structure for fixing the leg portion of the stand according to the present invention can settle the movement of the PDP module 1 faster than the prior art one.

By using FIG. 4, the following describes another embodiment of the present invention.

FIG. 4 illustrates the structure of an image display apparatus according to the embodiment.

Figure 4A:
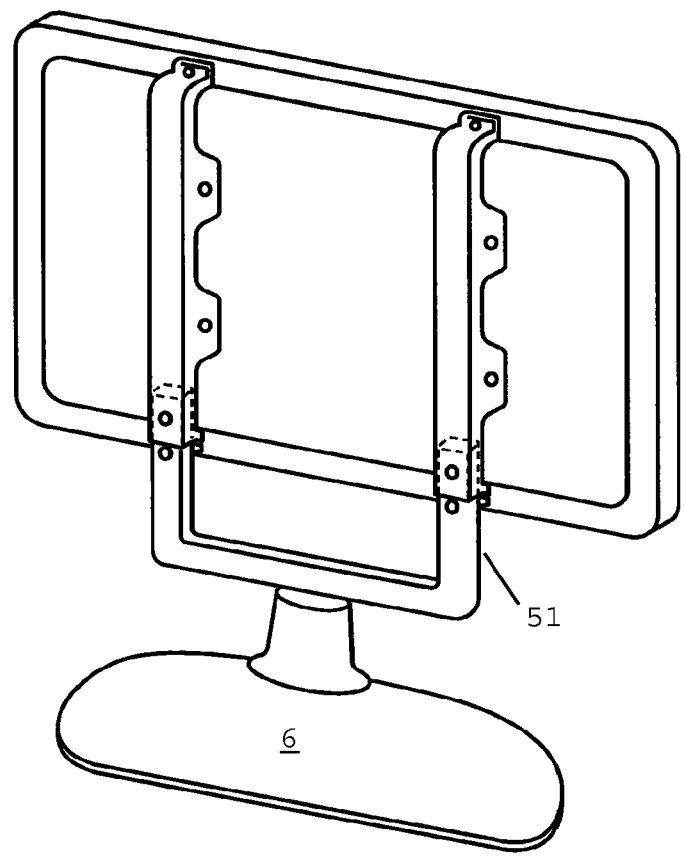
FIG. 4 shows the construction of an image display apparatus in accordance with another embodiment of the present invention.
Figure 4B:
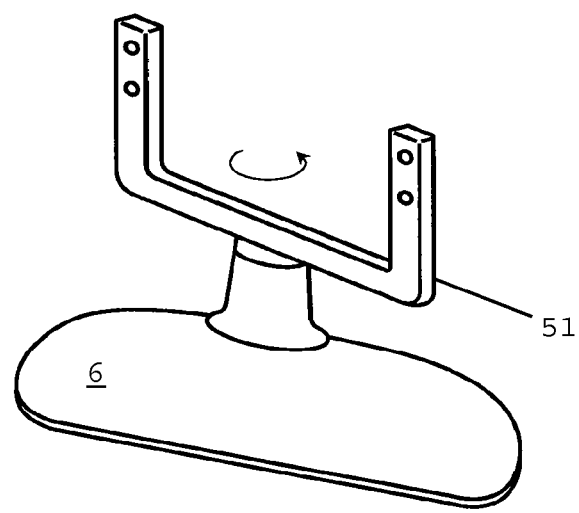
Figure 5:
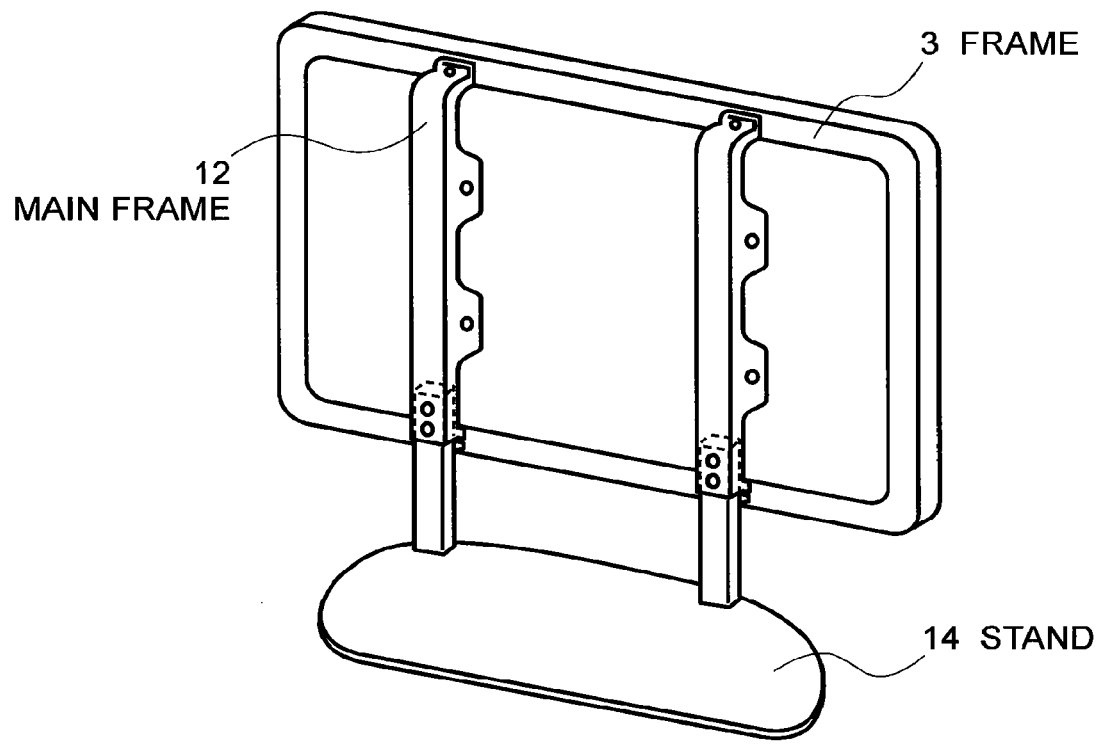
FIG. 5 is a perspective rear view of a PDP apparatus employing a prior art stand-attaching structure.

FIG. 4A is a perspective view illustrating a main unit which is set up with a swivel stand 6. FIG. 4B is a perspective view of the swivel stand 6.

Instead of the stand employed in the previous embodiment, the present embodiment employs this swivel stand 6 provided with a square U-shaped leg portion 51.

The square U-shaped leg portion 51 is designed to rotate a predetermined angle on the swivel stand 6, allowing the viewer to direct the screen to an angle suitable for viewing.

Except for the shape of the leg portion, this embodiment is the same as the above-described embodiment: with screws located at different heights, the leg portion 51 and the main frames 2 and the leg portion 51 and the outer frame 3 are respectively screwed together.

What is claimed is:

1. An image display apparatus comprising:
a display module;
an outer frame shaped so as to fit along the rim of the rear surface of the display module;
a hollow, bar-shaped main frame for supporting the display module, the main frame being arranged to extend vertically and fixed to the upper and lower portions of the outer frame and to the rear surface of the display module by a fixing part; and
a stand for supporting the display module, the stand having a leg portion, wherein,
the leg portion of the stand is inserted into the main frame, the leg portion and the main frame are fastened together by screwing a screw through a screw hole formed through the main frame and a first screw hole formed through the leg portion, and the leg portion and a fixing part of the outer frame are fastened together by screwing a screw through a second screw hole formed through the leg portion and a screw hole formed in the fixing part of the outer frame, the first screw hole and the second screw hole being formed through opposite faces of the leg portion and at different heights, and the leg portion is square U-shaped and rotatably mounted on the stand.

* * * * *